June 3, 1958 W. KASTEN 2,837,214
FILTER-DEMULSIFIER ASSEMBLY
Filed July 15, 1954
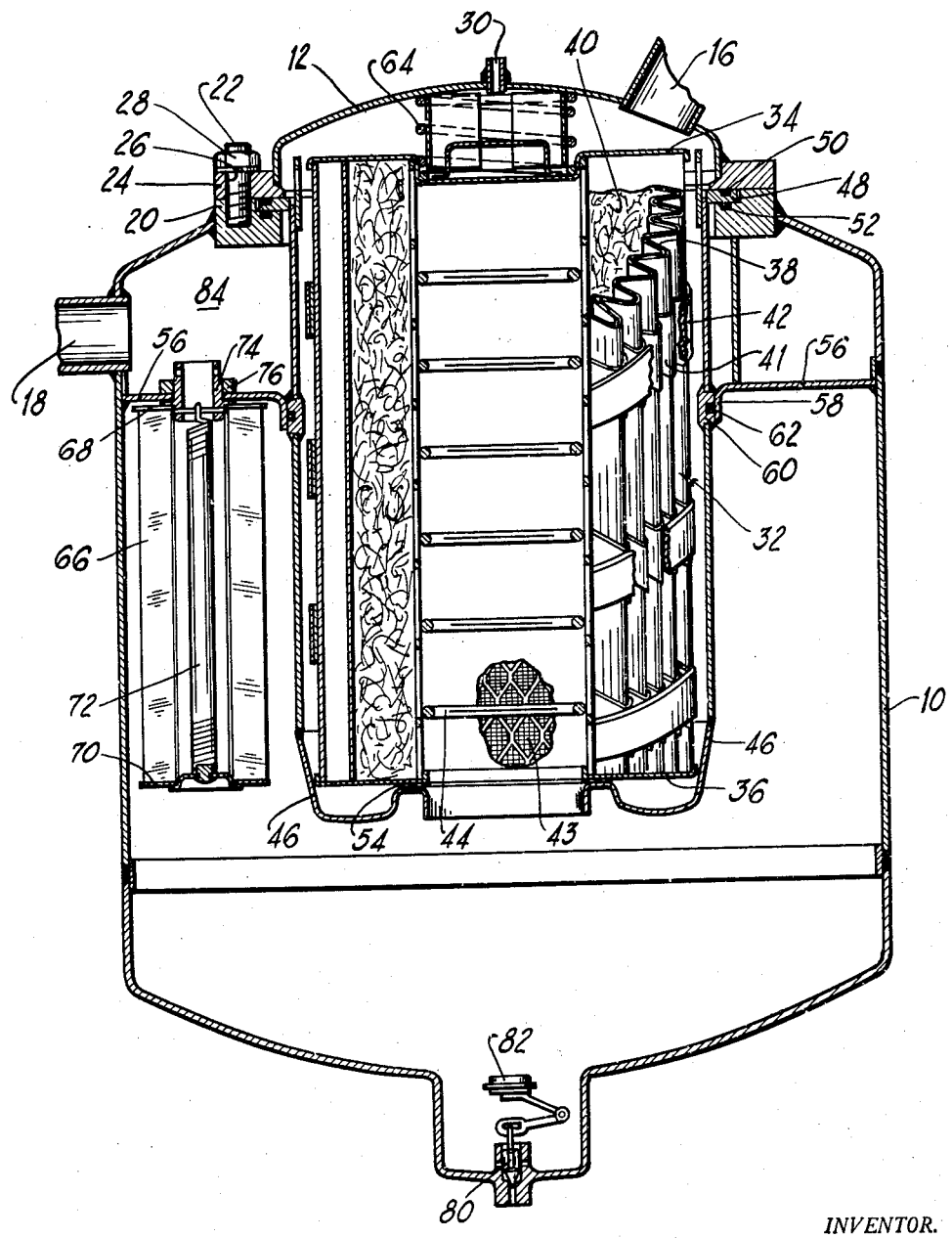
INVENTOR.
WALTER KASTEN
BY
ATTORNEY United States Patent Office 2,837,214
Patented June 3, 1958

2,837,214

FILTER-DEMULSIFIER ASSEMBLY

Walter Kasten, Royal Oak, Mich., assignor to Bendix Aviation Corporation, South Bend, Ind., a corporation of Delaware Application July 15, 1954, Serial No. 443,519

3 Claims. (Cl. 210—300)

This invention relates to filters and, more particularly, to a compound filter-demulsifier of the type used for removal of both solid and liquid contaminants from liquid fuels.

Present military techniques call for increasingly faster and more efficient fueling of all types of military vehicles. Inasmuch as this fueling is often done in the field from sources which are subject to contamination, it has become necessary to provide filtration devices which have very large capacities and yet are capable of high efficiencies in the removal of both solids and liquids. These high volume units are often subjected to pressures which not only put a strain on the casing and sealing members but also tend to deform the filtering and demulsifying elements. In the past it has been customary to make such units with two large and heavy flanges around the outside of the casing which are bolted together to seal the unit. This construction is undesirable both because of the difficulty of attaining a good seal over such a large joint and because of the cost and weight of material in such flanges. In some installations, considerations of available space may also make such flanges undesirable. Another difficulty which has been experienced is that where a pleated filtering member is used in conjunction with a glass wool demulsifier, there is a tendency for the pleats to be pressed together under the force of the fluid pressure differential to which it is subjected, thereby materially decreasing the filtering area. It is, therefore, an object of the present invention to provide a combination pleated filtering and glass wool demulsifying element in which means are provided for maintaining the pleats in the desired spaced relationship.

It is another object of the present invention to provide a compound filtering and demulsifying unit which is capable of efficient operation under high filtration speeds.

It is a further object of the present invention to provide a compound filtering and demulsifying unit which will easily withstand high fluid pressures, yet is very light and compact.

It is a further object to provide a construction for a compound filter-demulsifier in which the diameter of the flanges required is less than the diameter of the unit, yet all the operational elements within the unit remain easily accessible.

Other objects and advantages will become apparent from the following specification.

Referring to the drawing, a large container 10 is shown closed at the top by means of a cover 12. A fluid inlet passage 16 is attached to cover 12 and a fluid outlet passage 18 to container 10. Forming part of container 10 is a heavy flange 20 which has a series of threaded members 22 permanently secured thereto and spaced regularly around its periphery. A similar flange 24 forms part of cover 12 and is provided with holes 26 corresponding with threaded members 22. Cover 12 is thereby fastened to container 10 by means of nuts 28 which are threadedly engaged with members 22. A vent 30 is provided in the top of cover 12 to allow air to escape as the unit is being filled.

A filtering and demulsifying element 32 (drawn partially in perspective to show detail) is positioned at the center of container 10 immediately under cover 12. This element which has an upper endcap 34 and a lower endcap 36 is composed of a pleated outer filtering member 38 of a resin-impregnated fibrous material and an inner demulsifier element 40 which may be composed of glass wool. Interleaved between the pleats of member 38 are pleated spacing members 41, also of resin-impregnated fibrous material, which prevent pressing together of the pleats when the element is under pressure. Holding members 41 in position are bands 42 which may be made of glass cloth. Serving as a core for element 32 is a cylindrical member 43 which may be fashioned from expanded metal and which may have additional reinforcing members such as rings 44 to prevent collapsing of the element under very high pressures. It is, of course, desirable that the core interfere as little as possible with fluid flow. This element is positioned within and supported by a removable shell member 46 having a flange 48 which is clamped between flanges 20 and 24. Liquid-tight seals between these flanges are effected by means of O-rings 50 and 52. An additional seal is effected between shell 46 and endplate 36 by means of a gasket 54. Fastened to the inside wall of container 10 is an annular plate 56 having a lip 58 turned downward on its inside edge. Positioned around the sidewall of shell 46 is an annular metal reinforcing member 60 carrying an O-ring 62 which forms a seal between lip 58 and shell 46. Element 32 is forced downward against sealing means 54 by means of a spring 64 which is mounted on the underside of cap 12.

The annular plate 56 is drilled to receive a series of pleated filter elements 66. These elements which have endcaps 68 and 70 and which are held in assembled position by a spring 72 may be of any number depending upon the size of the unit and are evenly spaced around plate 56. Each such element is mounted to plate 56 by means of a ferrule 74 attached to endcap 68 and which is held to said plate by means of a nut 76. Pleated element 66 is preferably made of a resin-impregnated paper as is pleated member 38.

At the bottom of container 10 is a valve 80, controlled by a float 82 which is so designed that it will float only on the heavier liquid contaminant rather than on the continuous phase which is being demulsified. Therefore, if water is being removed from gasoline, the float will be unaffected by the gasoline and will float only when sufficient water has been collected to cause it to float thereon. As soon as the float is lifted by the accumulation of water in the bottom of container 10, valve 80 will also raise, thereby allowing the water to escape through the ports provided for that purpose.

By means of the structure and sealing means herein described, three separate sealed chambers have been defined, entry from one to the other being possible only through filter-demulsifier element 32 or through filter element 66. The contaminated fluid entering the unit at inlet passage 16 collects around element 32 inside of shell 46. Because of the pressure drop across the unit this fluid is forced through pleated element 38, leaving any particles of solid matter which may be present on the outside surface thereof. In passing through the glass wool demulsifier 40, the tiny droplets of the dispersed phase are coalesced into larger drops and, being heavier, tend to settle in the bottom of container 10. The bottom of container 10 including the outside of shell 46 and the bottom of plate 56 roughly define a second sealed chamber. Because of the high speed of the fluid through this unit, some of the dispersed phase, although coalesced into large drops, may be carried along with the continuous phase to the secondary filter element 66. This element will not pass comparatively large drops of the dispersed phase and they therefore will collect on the outside of the pleats and subsequently drop to the bottom. The continuous phase is further purified in passing through pleated element 66 and flows out the top of said element through the center of ferrule 74 into a chamber 84, which receives the purified fluid from all of the pleated elements 66 attached to plate 56. This fluid then flows out through outlet passage 18.

Although only one embodiment of the invention has been illustrated, various changes in the arrangement of the filtering device and parts thereof may be made and various other materials may be used as requirements dictate.

I claim:

1. A fluid filtering and demulsifying unit comprising an outer casing having an opening at the top which is substantially smaller in diameter than said casing, a flange around said opening, an annular shelf attached to the inside of the sidewall of said casing, and means defining a fluid outlet passage attached to said sidewall above said shelf; a cover for said casing having a fluid inlet passage and a flange around the periphery of said cover; a cylindrical inner casing adapted to be inserted into said opening, said casing having a flange at the top, sealing means around the sidewall thereof adapted to cooperate with said annular shelf; fastening means holding said flanges in sealing engagement; a filtering and demulsifying element within and supported by said inner casing; and a plurality of pleated filtering elements attached to the bottom of said annular shelf said filtering and demulsifying element and said pleated filtering elements being operatively positioned in series between said fluid inlet passage and said fluid outlet passage.

2. An apparatus for removing contaminants from a liquid, comprising an outer casing, an inner casing spaced from the sidewall and bottom of said outer casing and connected with said outer casing through an opening in the lower end thereof, sealing means on the sidewall of said inner casing, a liquid inlet passage communicating with said inner casing, a liquid outlet passage in said outer casing near the top thereof, a filter-demulsifier unit in said inner casing interposed between said inlet passage and the opening in the bottom of said casing, an annular shelf attached to the interior sidewall of said outer casing having means cooperating with said sealing means to divide the space between said inner and outer casings into upper and lower chambers, a plurality of pleated filter elements attached to the bottom of said shelf having outlets exhausting into said upper chamber thereby communicating with said fluid outlet passage, and a sump in the lower end of said outer casing for collecting the contaminating liquid as a separate layer.

3. An apparatus for removing contaminants from a liquid, comprising an outer casing having an opening at the top, said opening being substantially smaller in diameter than said casing, an inner casing spaced from the sidewall and bottom of said outer casing and connected with said outer casing through an opening in the lower end thereof, sealing means on the sidewall of said inner casing, a cover for said outer casing having a liquid inlet passage communicating with said inner casing, a liquid outlet passage in said outer casing near the top thereof, a filter-demulsifier unit in said inner casing operatively positioned between said inlet passage and the opening in the bottom of said casing, an annular shelf attached to the interior sidewall of said outer casing having means cooperating with said sealing means, and filter elements attached to the bottom of said shelf having outlets communicating with said outlet passage.

References Cited in the file of this patent

UNITED STATES PATENTS

| 927,743 | Morrison | July 13, 1909 |
| 2,218,800 | Williams | Oct. 22, 1940 |
| 2,279,423 | Vokes | Apr. 14, 1942 |
| 2,413,991 | Newman | Jan. 7, 1947 |
| 2,523,793 | Vance | Sept. 26, 1950 |
| 2,608,302 | Mattei | Aug. 26, 1952 |
| 2,609,932 | Fricke | Sept. 9, 1952 |
| 2,619,231 | Abbot | Nov. 25, 1952 |
| 2,626,709 | Krieble | Jan. 27, 1953 |
| 2,707,563 | Kasten et al. | May 3, 1955 |

FOREIGN PATENTS

| 678,025 | Great Britain | Aug. 27, 1952 |
| 1,059,010 | France | Mar. 22, 1954 |